(12) United States Patent
Lott et al.

(10) Patent No.: US 8,725,190 B2
(45) Date of Patent: May 13, 2014

(54) LOAD-ADAPTIVE UPLINK TRANSMIT POWER

(75) Inventors: Christopher Gerard Lott, San Diego, CA (US); Rashid Ahmed Akbar Attar, San Diego, CA (US); Donna Ghosh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 12/627,746

(22) Filed: Nov. 30, 2009

(65) Prior Publication Data

US 2010/0167780 A1 Jul. 1, 2010

Related U.S. Application Data

(60) Provisional application No. 61/118,934, filed on Dec. 1, 2008.

(51) Int. Cl.
*H04B 7/00* (2006.01)

(52) U.S. Cl.
USPC ..... 455/522; 455/67.11; 455/445; 455/452.1; 455/436; 455/435.2; 370/236; 370/329; 370/336; 370/337; 370/498

(58) Field of Classification Search
USPC ............... 455/67.11, 70, 522, 445, 450, 451, 455/452.1, 432.1, 434, 435.2, 436, 438, 455/439, 63.1, 73; 370/236, 329, 336, 337, 370/498, 492, 468, 345
See application file for complete search history.

(56) References Cited

U.S. PATENT DOCUMENTS

| 7,885,239 | B1* | 2/2011 | Oroskar et al. | 370/336 |
|---|---|---|---|---|
| 8,000,284 | B2* | 8/2011 | Lott et al. | 370/318 |
| 8,570,888 | B1* | 10/2013 | Vargantwar | 370/252 |
| 2003/0109274 | A1* | 6/2003 | Budka et al. | 455/522 |
| 2003/0198203 | A1* | 10/2003 | Antonio et al. | 370/329 |
| 2004/0162097 | A1* | 8/2004 | Vijayan et al. | 455/522 |

(Continued)

FOREIGN PATENT DOCUMENTS

CN 1864372 A 11/2006
WO WO2004082228 9/2004

OTHER PUBLICATIONS

International Search Report & Written Opinion—PCT/US2009/066222, International Search Authority—European Patent Office—Feb. 16, 2010.

(Continued)

*Primary Examiner* — Temesgh Ghebretinsae
*Assistant Examiner* — Md Talukder
(74) *Attorney, Agent, or Firm* — Jeffrey D. Jacobs

(57) ABSTRACT

An access terminal of a wireless communication system includes: an antenna; a transceiver; a load level monitor communicatively coupled to the transceiver and configured to receive, from the transceiver via the antenna, and analyze indications of reverse link wireless network traffic load over a period of time in a region of the wireless network containing the access terminal; a load level module configured to combine the indications over the period of time to determine a load level associated with the access terminal; and a transmission module configured to cause the transceiver to change from transmitting data packets in accordance with a first value of a transmission characteristic to transmitting data packets in accordance with a second value of the transmission characteristic in response to the load level being below a first load threshold value.

33 Claims, 5 Drawing Sheets

(56) References Cited

U.S. PATENT DOCUMENTS

| | | |
|---|---|---|
| 2004/0176042 A1* | 9/2004 | Lott et al. .................... 455/67.11 |
| 2007/0070908 A1* | 3/2007 | Ghosh et al. .................. 370/236 |
| 2007/0293260 A1* | 12/2007 | Xiao et al. .................... 455/522 |
| 2008/0151812 A1* | 6/2008 | Camp et al. ................... 370/320 |
| 2010/0008229 A1* | 1/2010 | Bi et al. ........................ 370/237 |
| 2010/0105336 A1* | 4/2010 | Attar et al. ................. 455/67.11 |
| 2010/0167780 A1* | 7/2010 | Lott et al. ..................... 455/522 |

OTHER PUBLICATIONS

Tokgoz Y et al: "On the reverse link performance of the CDMA2000 IxEV-DO revision a system with antenna array receivers" Global Telecommunications Conference, 2005. GLOBECOM '05. IEEE St. Loius, MO, USA Nov. 28-Dec. 2, 2005, Piscataway, NJ, USA,IEEE, vol. 6, Nov. 28, 2005, pp. 3373-3377, XP010882692 ISBN: 978-0-7803-9414-8 chapter I I.

Taiwan Search Report—TW098141054—TIPO—Dec. 11, 2012.

\* cited by examiner

LOAD-ADAPTIVE UPLINK TRANSMIT POWER

CROSS-REFERENCES TO RELATED APPLICATIONS

This application claims the benefit of U.S. Provisional Application No. 61/118,934, filed Dec. 1, 2008, entitled "Distributed Load-Adaptive Termination Target for a Wireless Uplink," which is incorporated herein by reference for all purposes.

BACKGROUND

Wireless communication systems are widely deployed to provide various communication services such as voice, video, packet data, messaging, broadcast, etc. These wireless systems may be multiple-access systems capable of supporting multiple users by sharing the available system resources, e.g., time, frequency, power. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of mobile terminals. The system may support operation on multiple carriers. Each carrier may be associated with a particular center frequency and a particular bandwidth. Each carrier may carry pilot and overhead information to support operation on the carrier. Each carrier may also carry data for terminals operating on the carrier. Some transmissions between a terminal and a base station may cause interference to, and may also observe interference from, other transmissions in the communication system. The interference may adversely impact the performance of all affected base stations.

Further, traffic load in the wireless communication system can impede performance of the system. Loads vary dynamically, with users coming to and leaving from the system or moving within the system over short periods of time. Further, traffic demands of users vary in time, e.g., with a user inducing a large load for a data download, but then no or little loading after that. Also, loads within the system are non-uniform. Different users may have different demands and thus induce different loading on the system. For example, one user may have a large data download requiring significant system resources while another user may have a small data demand requiring few system resources. Higher load levels typically increase interference, reducing performance quality and efficiency.

Referring to FIG. 7, a plot 130 shows a sequence of sub-packets transmitted over time from a wireless network access terminal (AT) to base transceiver stations (BTSs). As shown, four sub-packets 132, 134, 136, 138 are transmitted over time, with each sub-packet containing four slots, and there being eight slots in between each pair of sub-packets from the end of one sub-packet to the beginning of the next sub-packet. The eight-slot gaps 140 between the packets 132, 134, 136, 138 provide time for a BTS to acknowledge decoding of the sub-packet. A termination goal (TG) or termination target can be established for the AT as a goal for the amount of slots to be transmitted before decoding by the BTS. As indicated here, TG 4, TG 8, TG 12, TG 16 goals correspond to the end of transmission of the sub-packets 132, 134, 136, 138, respectively. The termination goal represents the amount of slots to be transmitted such that the percentage chance of decoding after the transmission of that number of slots is 99% or greater. Thus, with a termination goal TG 4, after transmission of the sub-packet 132, less than 1% of the time the sub-packet 132 will not be decoded by the BTS. For TG 16, a typical profile of decoding percentages is 10% being decoded after transmission of the sub-packet 132, 40% decode success after transmission of the sub-packet 134, another 40% successful decode after transmission of the sub-packet 136, and another 9% successful decode after transmission of the sub-packet 138. This, however, is an exemplary profile of decodes success rate, and other profiles may exist. The decode success profile will vary from channel to channel. The likelihood of successful decode depends on, among other things, the transmit power of the sub-packets 132, 134, 136, 138 from the AT.

As the termination goal number increases, the capacity from the AT increases and latency also increases. The converse is true as the termination goal number decreases. Thus, a termination goal of TG 16 has a higher capacity and higher latency than termination goals TG 4 or TG 8. A termination goal of TG 16 is referred to a high-capacity, or a HiCap termination goal while termination goals of TG 4 or TG 8 are often referred to as low-latency, or LoLat, termination goals.

In 1xEV-DO Rev-A systems, the peak data transmission rate from ATs is about 1.8 Mbps. In Rev-A, packet sizes range from 128 bits to 12 Kbits. With a packet size of 128 bits and a termination goal of TG 16, the data rate is 4.8 Kbits while with a packet size of 12 Kbits the data rate is 460 Kbits. To increase the data rate beyond 460 Kbps, the termination goal can be lowered. If the termination goal is lowered to TG 4, the data rate increases to about 1.8 Mbps. The increase of data rate comes, however, through an increase in transmission energy from the AT which results in higher interference and a reduction in capacity.

SUMMARY

An exemplary access terminal of a wireless communication system includes: an antenna configured to transmit and receive wireless communications; a transceiver coupled to the antenna; a load level monitor communicatively coupled to the transceiver and configured to receive, from the transceiver via the antenna, and analyze indications of reverse link wireless network traffic load over a period of time in a region of the wireless network containing the access terminal; a load level module communicatively coupled to the load level monitor and configured to combine the indications over the period of time to determine a load level associated with the access terminal; and a transmission module, communicatively coupled to the load level module and the transceiver, configured to cause the transceiver to change from transmitting data packets in accordance with a first value of a transmission characteristic to transmitting data packets in accordance with a second value of the transmission characteristic in response to the load level being below a first load threshold value.

Embodiments of such an access terminal may include one or more of the following features. The second value is such that the data packets transmitted in accordance with the second value will have a lower-delay termination target than the packets transmitted in accordance with the first value. The transmission characteristic is a transmit power used by the transceiver to transmit data packets, and wherein the second value is higher than the first value. The transmission module is configured to cause the transceiver to transmit data packets at a power level that is less than or equal to a transmit power limit value. The transmit power limit value is a ratio relative to a traffic-to-pilot ratio, and wherein the access terminal is configured to wirelessly receive the transmit power limit value via the antenna and store the transmit power limit value. The transmission module is further configured to transmit third data packets from the access terminal using the first value in response to the load level being above a second threshold level. The first threshold load level and the second threshold load level are equal. The transmission module is configured to determine that transmitting the second data packets using a lower-delay termination target is permitted. The load level module is configured to average the indications over the period of time to determine the load level associated with the access terminal.

An exemplary load-adaptive method of transmitting information in a wireless network from an access terminal includes: transmitting first data packets from the access terminal using a transmission characteristic of a first value; receiving, at the access terminal, indications of reverse link wireless network traffic load over a period of time in a region of the wireless network containing the access terminal; combining the indications over the period of time to determine a load level associated with the access terminal; determining whether the load level is below a first threshold load level; and transmitting second data packets from the access terminal using a transmission characteristic of a second value in response to the load level being determined to be below the first threshold level.

Embodiments of such a method may include one or more of the following features. The second data packets are transmitted with a lower-delay termination target than the first packets. The transmission characteristic is a transmit power used by the access terminal to transmit data packets, and wherein the second value is higher than the first value. The second value is less than or equal to a transmit power limit value. The transmit power limit value is a ratio relative to a traffic-to-pilot ratio, and wherein the method further comprises wirelessly receiving the transmit power limit value at the access terminal. The method further includes: determining, with the transmission characteristic at the second value, whether the load level is above a second threshold load level; and transmitting third data packets from the access terminal using the transmission characteristic of the first value in response to the load level being determined to be above the second threshold level. The first threshold load level and the second threshold load level are equal. The method further includes determining that transmitting the second data packets using a lower-delay termination target is permitted. The combining comprises averaging.

An exemplary computer program product according to the disclosure includes: a processor-readable medium storing processor-readable instructions configured to cause a processor to: transmit first data packets from an access terminal of a wireless communication network using a transmit power of a first value; receive indications of reverse link wireless network traffic load over a period of time in a region of the wireless communication network containing the access terminal; combine the indications over the period of time to determine a load level associated with the access terminal; and transmit second data packets from the access terminal using a transmit power of a second value, higher than the first value, in response to the load level being below the first threshold level.

Embodiments of such a computer program product may include one or more of the following features. The instructions are configured to cause the processor to transmit the second data packets such that the second value is less than or equal to a transmit power limit value. The transmit power limit value is a ratio relative to a traffic-to-pilot ratio. The second value is sufficiently high to reduce a termination goal of the second data packets relative to the first data packets. The computer program product further includes instructions configured to cause the processor to reduce the transmit power to transmit third data packets, after the second data packets, from the access terminal using the transmit power of the first value in response to the load level being above the second threshold level while transmitting the second data packets. The first threshold load level and the second threshold load level are equal. The computer program product further includes instructions configured to cause the processor to inhibit transmission of the second data packets at the transmit power of the second level unless an indication is received that using a higher transmit power by the access terminal is permitted. The instructions configured to cause the processor to combine the indications are configured to cause the processor to average the indications.

An exemplary access terminal configured to provide a load-adaptive termination goal includes: an antenna configured to transmit and receive wireless communications; a transceiver coupled to the antenna; transmitting means, communicatively coupled to the transceiver, for transmitting first data packets in accordance with a first termination goal in response to a traffic load of a wireless network associated with the access terminal being below a first threshold and for transmitting second data packets in accordance with a second termination goal in response to the traffic load of the wireless network being above a second threshold, the first termination goal being lower than the second termination goal.

Embodiments of such an access terminal may include one or more of the following features. The transmitting means are configured to transmit the first data packets with a higher transmit power level than the second data packets. The transmitting means are configured to transmit the first data packets at a power level up to a transmit power limit value. The transmit power limit value is a ratio relative to a traffic-to-pilot ratio, and wherein the access terminal further comprises receiving means for receiving the transmit power limit value via the antenna and the transceiver and storing the transmit power limit value. The transmitting means are further for changing from transmitting the second data packets to transmitting the first data packets in response to the traffic load being above the second threshold. The first threshold and the second threshold are equal. The access terminal further includes load means, communicatively coupled to the transmitting means, for averaging indications over time of traffic load of the wireless network associated with the access terminal and providing an indication of the traffic load to the transmitting means.

Items and/or techniques described herein may provide one or more of the following capabilities. A termination goal of uplink/reverse link transmissions in a wireless communication network can be dynamically altered in a distributed, load-adaptive manner. A power, latency, and data rate tradeoff in a wireless network can be dynamically assessed and altered in load-dependent manner. An access terminal in a wireless network can implement controlled inefficiency, e.g., during times of light loading. Termination goal of wireless network reverse link transmission can be reduced during times of light network loading such that increased loading is acceptable. Transmit power can be reduced and termination goal increased of wireless network reverse link transmission during times of heavy network loading to accommodate other traffic. While item/technique-effect pairs have been described, it may be possible for a noted effect to be achieved by means other than those noted, and a noted item/technique may not necessarily yield the noted effect.

In the figures, components with similar relevant characteristics and/or features may have the same reference label.

DETAILED DESCRIPTION

Techniques described herein provide mechanisms for providing load-adaptive reverse-link termination targets and transmit powers for wireless network access terminals in a distributed manner. For example, wireless network access terminals can monitor over time an indication of load level provided by base transceiver stations. If the access terminal determine that the loads from all the base transceiver stations within the access terminal's active set indicates light loading, then the access terminal can decrease the termination goal value and increase the transmission power from the access terminal. The access terminal can increase the power it uses to transmit data up to a boost factor provided to the access terminal from the base transceiver stations. The access terminal can continue to send data at the lower termination goal value and increase power until the access terminal determines that the loading of the base transceiver stations within access terminal's active set is no longer considered light. Other embodiments are within the scope of the disclosure and claims.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95 and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes a 1xEV-DO system for exemplary purposes, although the techniques are applicable beyond 1xEV-DO applications.

Figure 1:
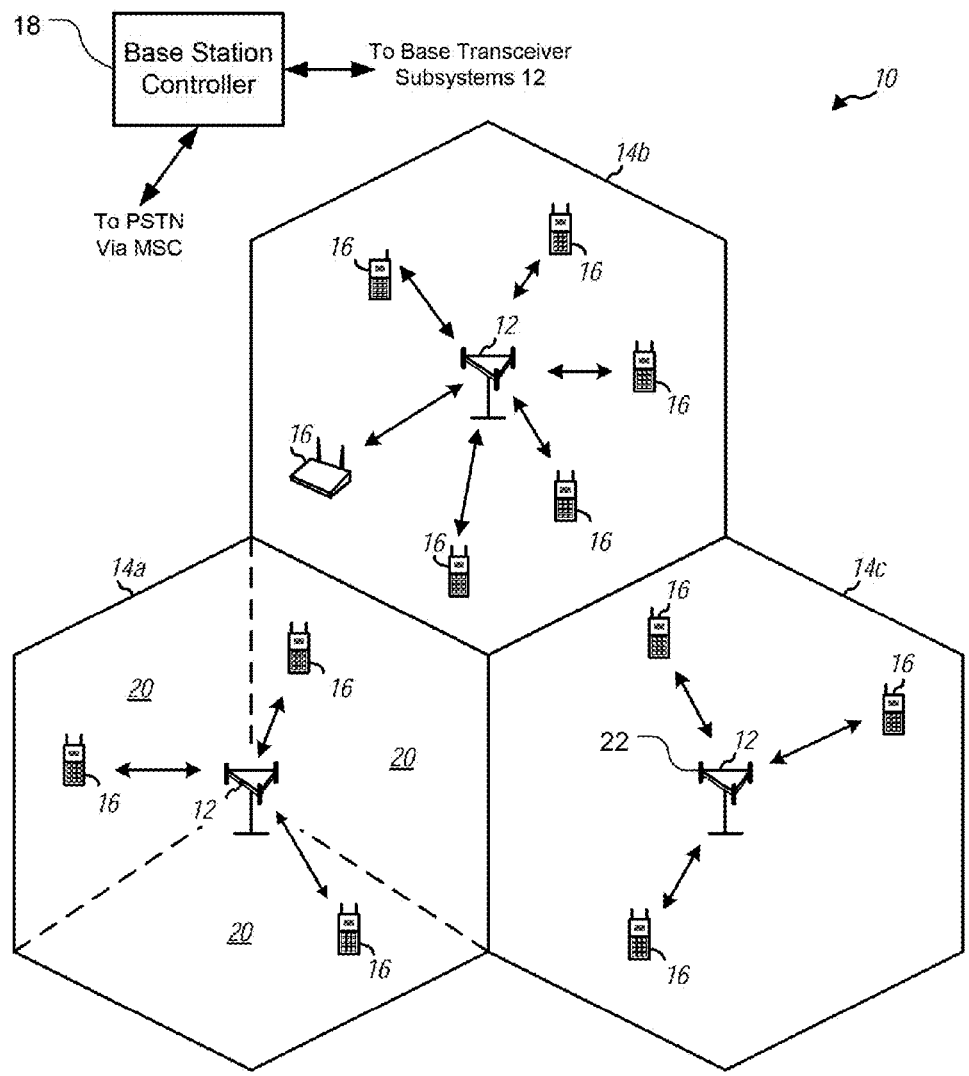
FIG. 1 is a simplified diagram of a wireless communication system, including a base station controller, base stations, and access terminals.

Referring to FIG. 1, a wireless communication system 10 includes base transceiver stations (BTSs) 12, disposed in cells 14, mobile access terminals 16 (ATs), and a base station controller (BSC) 18. The system 10 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc. Here, the system 10 is a multi-carrier 1xEV-DO Rev. A network capable of distributed dynamic uplink transmit power responsive to network load.

The BTSs 12 can wirelessly communicate with the terminals 16 via an antenna 24. The BTS 12 may also be referred to as an access point, an access node (AN), a Node B, an evolved Node B (eNB), etc. The BTSs 12 are configured to communicate with the ATs 16 under the control of the BSC 18 via multiple carriers. Each of the base stations 12 can provide communication coverage for a respective geographic area, here the cell 14a, 14b, or 14c. Each of the cells 14 of the base stations 12 is partitioned into multiple (here three) sectors 20 (as shown in cell 14a) as a function of the base station antenna 22. While FIG. 1 shows the sectors 20 as being sharply defined, with the ATs being in only one sector 20 each, the sectors 20 overlap and a single AT 16 can be in multiple sectors 20 and multiple cells 14 simultaneously such that the BTSs 12 can communicate with the AT 16 through more than one sector 20 and more than one cell 14.

The system 10 may include only macro base stations 12 or it can have base stations 12 of different types, e.g., macro, pico, and/or femto base stations. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The ATs 16 can be dispersed throughout the cells 14. The ATs 16 may be referred to as mobile stations, mobile devices, user equipment (UE), or subscriber units. The ATs 16 here include cellular phones and a wireless communication device, but can also include personal digital assistants (PDAs), other handheld devices, netbooks, notebook computers, etc.

Figure 2:
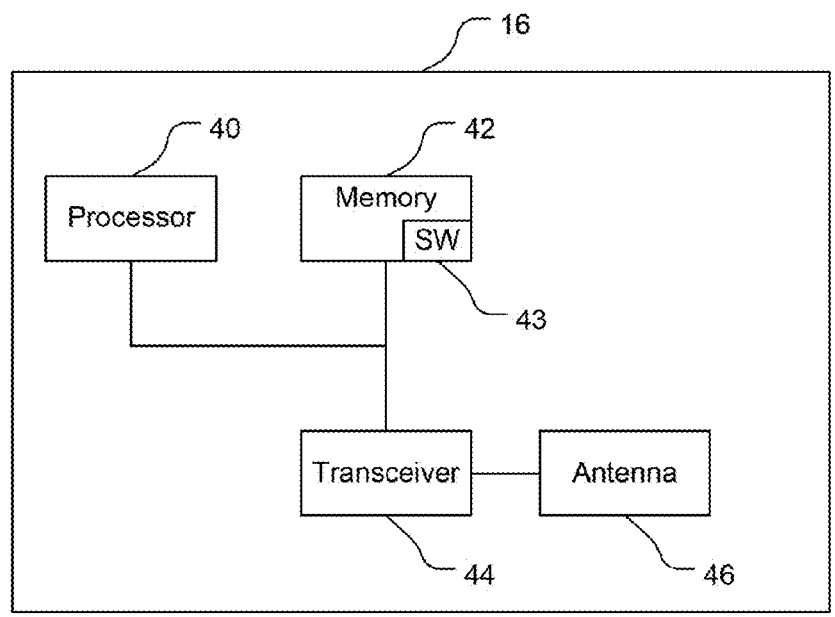
FIG. 2 is a block diagram of components of an access terminal shown in FIG. 1.

Referring also to FIG. 2, an exemplary one of the ATs 16 comprises a computer system including a processor 40, memory 42, a transceiver 44, and an antenna 46. The transceiver 44 is configured to communicate bi-directionally with the BTS 12. The processor 40 is preferably an intelligent hardware device, e.g., a central processing unit (CPU) such as those made by Intel® Corporation or AMD®, a microcontroller, an application specific integrated circuit (ASIC), etc. The memory 42 includes random access memory (RAM) and read-only memory (ROM). The memory 42 stores computer-readable, computer-executable software code 43 containing instructions that are configured to, when executed, cause the processor 40 to perform various functions described herein.

Alternatively, the software 43 may not be directly executable by the processor 40 but is configured to cause the computer, e.g., when compiled and executed, to perform the functions.

The ATs 16 can communicate with the base stations 12 via forward and reverse links using an active set of carriers. The forward link (or downlink) refers to the communication link from the base station 12 to the terminal 16, and the reverse link (or uplink) refers to the communication link from the terminal 16 to the base station 12. The active set of carriers is the set of carriers for which communication with a base station 12 has been determined to be possible to a satisfactory degree. The active set can include sector-carrier pairs (pilots) corresponding to the base stations 12 that will decode transmissions from the AT 16 on the uplink and which can be selected by the AT 16 to receive downlink transmissions.

The ATs 16 designate respective BTSs 12 for each of the carriers within the ATs' active sets of carriers. Each of the ATs 16 determines and selects, e.g., using a data rate control (DRC) signal, one of the BTSs 12 for each of its active set carriers. The selection is typically based upon which BTS 12 provides the best signal to interference-plus-noise ratio (SINR).

Figure 3:
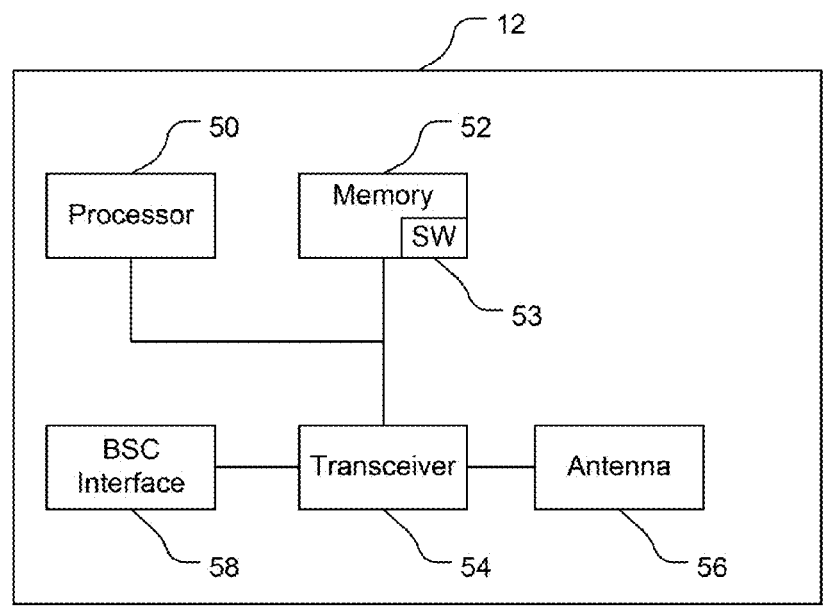
FIG. 3 is a block diagram of components of a base transceiver station shown in FIG. 1.

Referring also to FIG. 3, an exemplary one of the BTSs 12 comprises a computer system including a processor 50, memory 52, a transceiver 54, an antenna 56, and a BSC interface 58. The transceiver 54 is configured to communicate bi-directionally with the ATs 16. The processor 50 is preferably an intelligent hardware device, e.g., a central processing unit (CPU) such as those made by Intel® Corporation or AMD®, a microcontroller, an application specific integrated circuit (ASIC), etc. The memory 52 includes random access memory (RAM) and read-only memory (ROM). The memory 52 stores computer-readable, computer-executable software code 53 containing instructions that are configured to, when executed, cause the processor 50 to perform various functions described herein. Alternatively, the software 53 may not be directly executable by the processor 50 but is configured to cause the computer, e.g., when compiled and executed, to perform the functions. The BTS 12 is connected and configured for bi-directional communication with the BSC 18. Typically, as here, the BSC 18 is hardwired to the BTSs 12. The BTS 12 is configured to convey, receive, encode, and decode transmissions to and from the BSC 18 using the transceiver 54 via the BSC interface 58. The BTS 12, through the processor 50 and the software code 53, implements, among other things, a scheduler to route data over pilots to the ATs 16 within the BTS's cell 14.

The traffic load in the network 10 changes dynamically across the sectors and carriers as the ATs move and/or turn on/off applications. Data demand in the network 10 is intrinsically non-uniform, leading to chokepoint sectors 20 or pilots and time variations so that which sectors or pilots are chokepoints change over time. A chokepoint sector operates at or close to a maximum tolerable or desired load level for that sector 20. Further, the non-uniform demand leads to sectors 20 or pilots that are lightly loaded in which interference is a little concern. It has been found that typically there exists only a small portion of sectors 20 that are chokepoints at any given time and that chokepoint sectors typically have several lightly-loaded neighbor sectors. Neighbor sectors may not be adjacent physically, but are similar in a radio frequency (RF) sense as to the quality of communications available to a particular AT 16.

Figure 4:
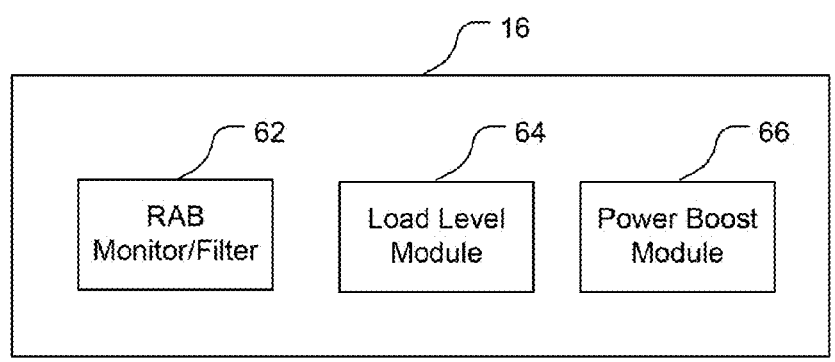
FIG. 4 is a block diagram of functional components of the access terminal shown in FIG. 2.

Referring to FIG. 4, the access terminal 16 includes a load-level monitor, here an RAB monitor/filter, 62, a load-level module 64, and a power boost module 66. The monitor 62, module 64, and module 66 are configured to determine load-level of the BTSs 12 in the AT's active set and determine whether this loading is a light loading or heavy loading. The monitor 62, module 64, and module 66 are further configured to boost the power with which data are transmitted from the AT 16 to reduce the termination goal of the data transmitted from the AT 16 if the loading is determined to be light. The power boost module 66 can receive indications from the BTSs 12 of a minimum allowed termination goal and whether the AT 16 has permission to use a lower termination goal in response to reverse link load conditions.

The monitor/filter 62 is configured to monitor indications of loading from the BTSs 12 in the AT's active set. The monitor/filter 62 can receive a reverse activity bit (RAB) from each of the BTSs 12, with the RAB being a single bit with a value of either one or zero indicative of a load experienced by the BTS 12 relative to a threshold load value. The monitor/filter 62 can filter or average the value of the RAB over time to produce a filtered RAB (FRAB) and provide indications of the FRAB. An RAB with a value of one indicates that load experienced by the corresponding BTS 12 is greater than a target loading level. An RAB value of zero indicates that the load experienced by the corresponding BTS 12 is at or below the target loading level. Alternatively, an RAB of one could indicate loading at or above the threshold and a value of zero could indicate loading below the threshold.

The load level module 64 is configured to receive the indications of the FRAB values from the monitor/filter 62. The load level module 64 is configured to average the FRAB values from all the BTSs 12 in the AT's active set to determine the relative loading level for the region of the system 10 (FIG. 1) where the AT 16 is presently. An aggregate FRAB at or close to one indicates that the corresponding BTSs 12 are heavily loaded, while a FRAB value of about 0.5 indicates that the loading is about what is expected for the BTSs 12, and a FRAB value less than or equal to about 0.1 indicates that the corresponding BTSs 12 are lightly loaded.

The power boost module 66 is configured to communicate with the load level module 64 to determine whether to boost the transmission power from the AT 16. The power boost module 66 analyzes the FRAB value provided by the load level module 64 averaged across the BTSs 12 and the AT's 16 active set to determine whether the region in which the AT 16 presently resides is lightly loaded. If the loading is light, e.g., the averaged FRAB value is lower than a load threshold value, then the module 66 will cause an increase in the transmit power, and if the loading is heavy and power is presently boosted, then the module 66 will cause a reduction in the transmit power. The amount of power boost is restrained by a T2PBoost value received and stored by the module 66 from the BTS 12 indicating a limit on the traffic power level relative to a pilot power level. The amount of power boost is also restrained by the load threshold value. The module 66 will determine whether to reduce transmit power if it is presently boosted. If the power is presently boosted, then the module 66 will cause a decrease in transmit power if the averaged FRAB value is or becomes greater than or equal to the load threshold.

Figure 5:
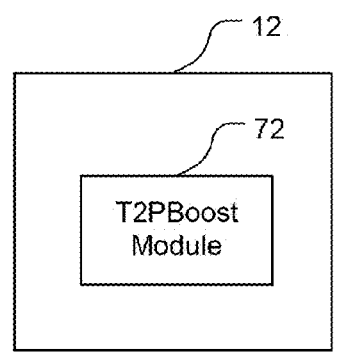
FIG. 5 is a block diagram of functional components of the base transceiver station shown in FIG. 3.

Referring to FIG. 5, the BTS 12 includes a T2PBoost module 72. The module 72 is configured to set and convey the T2PBoost value to the ATs 16 via the antenna 56 (FIG. 3). The module 72 is also configured to convey to the ATs 16 the minimum allowed termination goal and an indication as to whether the ATs 16 have permission to use a lower termination goal in response to reverse link load conditions.

Figure 6:
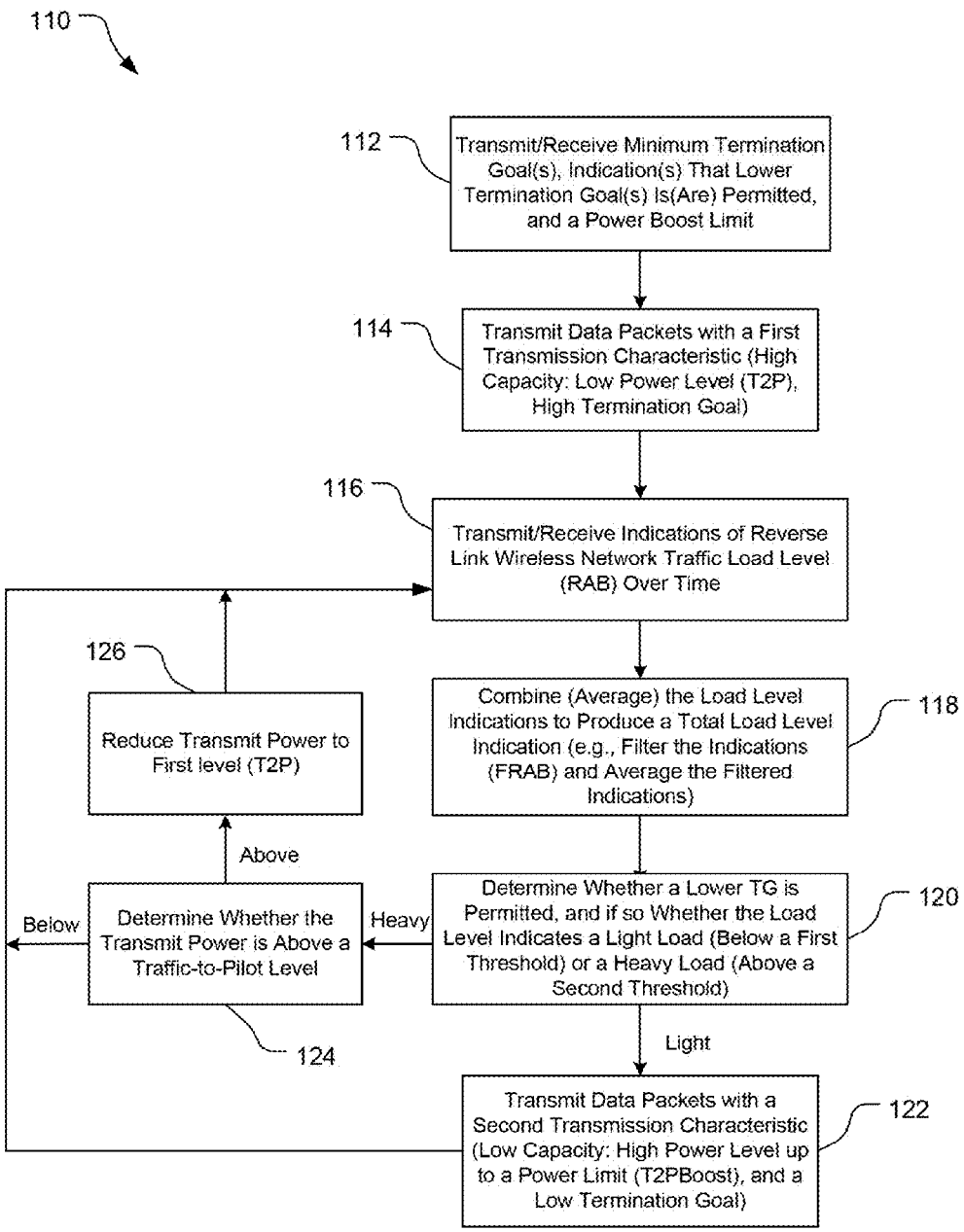
FIG. 6 is a block flow diagram of a process of implementing a load-adaptive termination target transmission in the system shown in FIG. 1.
Figure 7:
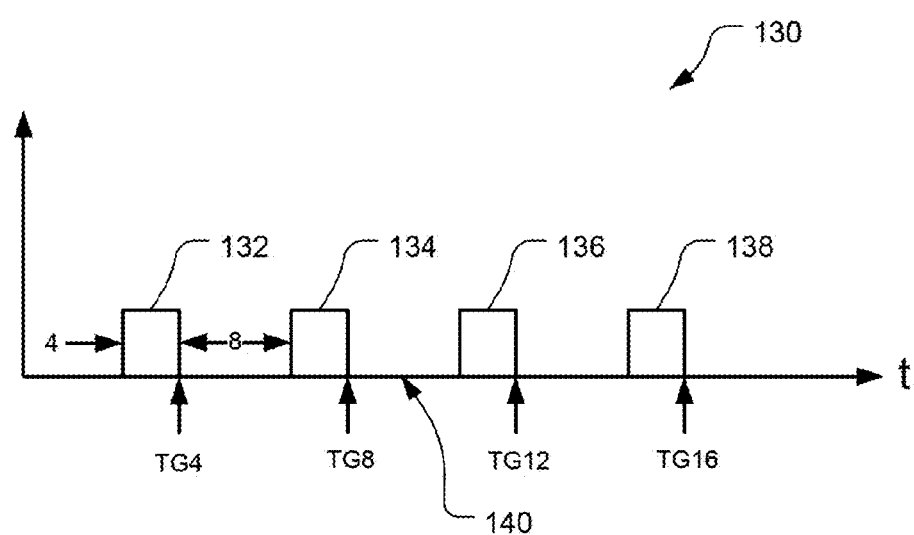
FIG. 7 is a timing diagram of transmission of reverse-link sub-packets in a wireless system.

Referring to FIG. 6, with further reference to FIGS. 1-5, a process 110 of altering reverse link termination target and transmit power, to provide distributed (across the ATs 16) load-adaptive transmit power and termination goal, includes the stages shown. The process 110 is, however, exemplary only and not limiting. The process 110 can be altered, e.g., by having stages added, removed, or rearranged.

At stage 112, each of the BTSs 12 transmits, and each of the ATs 16 receives, an indication of the minimum termination goal, an indication of whether the AT 16 has permission to use a lower termination goal in response to reverse link load conditions, and if so an indication of the power boost limit (T2PBoost). Different minimum termination goals may be transmitted by different BTSs 12 and/or to different ATs 16, and different permissions regarding lowering termination goals may be transmitted by different BTSs 12 and/or to different ATs 16. Further, the indication of whether a lower termination target is permitted may be the T2PBoost value itself.

At stage 114, the AT 16 transmits data packets with a first power level corresponding to a high capacity mode. The power level is a traffic-to-pilot (T2P) level that is predetermined by the AT 16 (e.g., as a default, or as agreed upon with the BTS 12) based upon an algorithm and/or parameters provided by the access network. The data packets have a high termination goal, e.g., TG 16, at this stage.

At stage 116, each of the BTSs 12 transmits a reverse activity bit (RAB) to the AT 16. The RAB provides an indication of the load level for the BTSs 12, or the sectors 20 for the BTSs 12. The AT 16 receives the load level indications, from the BTSs 12, in the RAB monitor/filter 62 and stores these indications for averaging over a predetermined time period.

At stage 118, the load level indications (RABs) are combined to produce a total load level indication. The monitor/filter 62 filters or averages the load level indications (RAB values) over time. The monitor/filter 62 filters the received RAB values to produce a filtered reverse activity bit (FRAB) value providing a long-term measure of load for the corresponding BTS 12. Here, for example, the filter 62 provides a 256 slot IIR (infinite impulse response) filter thus averaging the load indication over about one second. This amount of filtering, however, is exemplary and not limiting, and the duration of the filtering may be different and is preferably configurable. The load level module 64 receives indications of the FRAB values from the monitor/filter 62 for all the BTSs 12 in the AT's active set. The load level module 64 further combines, here averages, the FRAB values from all the BTSs 12 in the AT's active set. This averaging yields an aggregate average FRAB indicative of the relative loading level for the region of the system 10 (FIG. 1) where the AT 16 is presently. Alternatively, the RAB values could be combined and then filtered.

At stage 120, the power boost module 66 determines whether an increase in the uplink transmission power is permitted and if so, whether to increase the uplink transmission power based on the network loading indicated by the aggregate average FRAB. To determine whether the loading is light, the power boost module 66 compares the aggregate average FRAB with a light-load threshold, e.g., a value of 0.1. If the averaged FRAB value is less than or equal to about 0.1, then the power boost module 66 determines that the AT 16 can reduce the termination goal value by increasing the power of data transmitted by the AT 16, and the process 110 proceeds to stage 122. To determine whether the loading has become too high for the present transmit power, the power boost module 66 compares the FRAB with a heavy-load threshold. If the averaged FRAB value is greater than a heavy-load threshold, then the power boost module 66 determines that the AT 16 should reduce the transmission power to increase the termination goal and reducing loading of the network, and the process 110 proceeds to stage 124. The heavy-load threshold may be the same as the light-load threshold. Alternatively, the heavy-load threshold may be different from the light-load threshold, e.g., a FRAB value of 0.5 versus a FRAB value of 0.3 to provide hysteresis in the changing between termination targets.

At stage 122, the transmit power is increased and data packets are transmitted with increased power, relative to stage 114, to reduce the termination goal dynamically based on the network load. The power boost module 66 evaluates the power boost factor value provided by the BTSs 12 to determine how much power increase is available to the AT 16. The power boost factor, or T2PBoost, is a factor providing the upper limit on how much the AT 16 can boost the transmission power of the sub-packets from the AT 16. The power boost factor is a ratio indicating the amount of boost relative to the traffic-to-pilot ratio (T2P). For example, the T2PBoost value may be an indication of 2 to 4 times the present power amount (3-6 db) to transition from TG16 to TG4. The power boost module 66 will increase the power used by the AT 16 to transmit the data up to the power boost amount allowed by the power boost factor. The process 110 returns to stage 116 for further assessment of network loading and adaptation of transmit power and termination goal.

At stage 124, the power boost module 66 determines whether the present transmit power is above the initial T2P level. If so, then the process 110 proceeds to stage 126 where the power boost module reduces the transmit power to the T2P level to reduce traffic load in the network before the process returns to stage 116 for further assessment of network loading. Thus, if the AT 16 is transmitting at increased power relative to the traffic-to-pilot ratio, and the FRAB indicates that the network loading has become heavier than desired for the current transmit power, then the power boost module 66 will increase the termination goal value and reduce the power used by the AT 16 to transmit data sub-packets. If the transmit power is not above the T2P level, then the process 110 returns to stage 116.

With the process 110 returning to stage 116, the RAB monitor/filter 62 and load level module 64 will continue to determine whether the loading of the BTSs within the AT's 16 active set allow for increased power and reduced termination goal.

Considerations Regarding the Description

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. An access terminal of a wireless communication system, the access terminal comprising:
   an antenna configured to transmit and receive wireless communications;
   a transceiver coupled to the antenna;
   a load level monitor communicatively coupled to the transceiver and configured to receive, at the access terminal from the transceiver via the antenna from a plurality of base transceiver stations (BTSs) in a region of the wireless network containing the access terminal, indications of reverse link wireless network traffic load over a period of time in the region of the wireless network containing the access terminal and to analyze the indications;
   a load level module communicatively coupled to the load level monitor and configured to combine the indications for each of the plurality of BTSs over the period of time to obtain a filtered indication for each of the plurality of BTSs and to combine the filtered indications to determine an aggregate load level associated with the region of the wireless network containing the access terminal; and
   a transmission module, communicatively coupled to the load level module and the transceiver, configured to cause the transceiver to change from transmitting data packets in accordance with a first value of a transmission characteristic to transmitting data packets in accordance with a second value of the transmission characteristic in response to the aggregate load level being below a first load threshold value.

2. The access terminal of claim 1 wherein the second value is such that the data packets transmitted in accordance with the second value will have a lower-delay termination target than the packets transmitted in accordance with the first value.

3. The access terminal of claim 2 wherein the transmission characteristic is a transmit power used by the transceiver to transmit data packets, and wherein the second value is higher than the first value.

4. The access terminal of claim 3 wherein the transmission module is configured to cause the transceiver to transmit data packets at a power level that is less than or equal to a transmit power limit value.

5. The access terminal of claim 4 wherein the transmit power limit value is a ratio relative to a traffic-to-pilot ratio, and wherein the access terminal is configured to wirelessly receive the transmit power limit value via the antenna and store the transmit power limit value.

6. The access terminal of claim 1 wherein the load level module is configured to average the indications for each of the plurality of BTSs over the period of time to obtain the filtered indications.

7. A load-adaptive method of transmitting information in a wireless network from an access terminal, the method comprising:
   transmitting first data packets from the access terminal using a transmission characteristic of a first value;
   receiving, at the access terminal from a plurality of base transceiver stations (BTSs) in a region of the wireless network containing the access terminal, indications of reverse link wireless network traffic load over a period of time in the region of the wireless network containing the access terminal;
   combining the indications for each of the plurality of BTSs over the period of time to obtain a filtered indication for each of the plurality of BTSs;
   combining the filtered indications to determine an aggregate load level associated with the region of the wireless network containing the access terminal;
   determining whether the aggregate load level is below a first threshold load level; and
   transmitting second data packets from the access terminal using a transmission characteristic of a second value in response to the aggregate load level being determined to be below the first threshold load level.

8. The method of claim 7 wherein the second data packets are transmitted with a lower-delay termination target than the first packets.

9. The method of claim 8 wherein the transmission characteristic is a transmit power used by the access terminal to transmit data packets, and wherein the second value is higher than the first value.

10. The method of claim 9 wherein the second value is less than or equal to a transmit power limit value.

11. The method of claim 10 wherein the transmit power limit value is a ratio relative to a traffic-to-pilot ratio, and wherein the method further comprises wirelessly receiving the transmit power limit value at the access terminal.

12. The method of claim 7 further comprising:
   determining, after transmitting the second data packets using the transmission characteristic of the second value, whether the aggregate load level is above a second threshold load level; and
   transmitting third data packets from the access terminal using the transmission characteristic of the first value in response to the aggregate load level being determined to be above the second threshold load level.

13. The method of claim 7 further comprising determining that transmitting the second data packets using a lower-delay termination target is permitted.

14. The method of claim 7 wherein combining the indications for each of the plurality of BTSs comprises averaging the indications for each of the plurality of BTSs to obtain the filtered indications.

15. A non-transitory computer program product comprising:
   a processor-readable medium storing processor-readable instructions configured to cause a processor to:
      transmit first data packets from an access terminal of a wireless communication network using a transmit power of a first value;
      receive, at the access terminal from a plurality of base transceiver stations (BTSs) in a region of the wireless network containing the access terminal, indications of reverse link wireless network traffic load over a period of time in the region of the wireless communication network containing the access terminal;
      combine the indications for each of the plurality of BTSs over the period of time to obtain a filtered indication for each of the plurality of BTSs;
      combine the filtered indications to determine an aggregate load level associated with the region of the wireless network containing the access terminal; and
      transmit second data packets from the access terminal using a transmit power of a second value, higher than the first value, in response to the aggregate load level being below a first threshold load level.

16. The computer program product of claim 15 wherein the instructions are configured to cause the processor to transmit the second data packets such that the second value is less than or equal to a transmit power limit value.

17. The computer program product of claim 16 wherein the transmit power limit value is a ratio relative to a traffic-to-pilot ratio.

18. The computer program product of claim 15 wherein the second value is sufficiently high to reduce a termination goal of the second data packets relative to the first data packets.

19. The computer program product of claim 15 further comprising instructions configured to cause the processor to transmit third data packets, after the second data packets, from the access terminal using the transmit power of the first value in response to the aggregate load level being above a second threshold load level while transmitting the second data packets.

20. The computer program product of claim 15 further comprising instructions configured to cause the processor to inhibit transmission of the second data packets at the transmit power of the second level unless an indication is received that using a higher transmit power by the access terminal is permitted.

21. The computer program product of claim 15 wherein the instructions configured to cause the processor to combine the indications for each of the plurality of BTSs are configured to cause the processor to average the indications to obtain the filtered indications.

22. An access terminal configured to provide a load-adaptive termination goal, the access terminal comprising:
   an antenna configured to transmit and receive wireless communications;
   a transceiver coupled to the antenna;
   transmitting means, communicatively coupled to the transceiver, for transmitting first data packets in accordance with a first termination goal in response to an aggregate traffic load of a region of a wireless network associated with the access terminal being below a first threshold and for transmitting second data packets in accordance with a second termination goal in response to the aggregate traffic load being above a second threshold, the first termination goal being lower than the second termination goal; and
   load means, communicatively coupled to the transmitting means and the transceiver, for combining indications of reverse link wireless traffic load received by the transceiver from each of a plurality of base transceiver stations (BTSs) over a period of time to determine a filtered indication for each of the plurality of BTSs, to combine the filtered indications to obtain the aggregate traffic load, and for providing an indication of the aggregate traffic load to the transmitting means.

23. The access terminal of claim 22 wherein the transmitting means are configured to transmit the first data packets with a higher transmit power level than the second data packets.

24. The access terminal of claim 22 wherein the transmitting means are configured to transmit the first data packets at a power level up to a transmit power limit value.

25. The access terminal of claim 24 wherein the transmit power limit value is a ratio relative to a traffic-to-pilot ratio, and wherein the access terminal further comprises receiving means for receiving the transmit power limit value via the antenna and the transceiver and storing the transmit power limit value.

26. The access terminal of claim 1 wherein the load level monitor is further configured to receive the indications of reverse link wireless network traffic load as quantized indications.

27. The access terminal of claim 1 wherein the transmission module is further configured to cause the transceiver to change from transmitting data packets in accordance with the second value of the transmission characteristic to transmitting data packets in accordance with the first value of the transmission characteristic in response to the aggregate load level being above a second load threshold value.

28. The access terminal of claim 27 wherein the first load threshold value and the second load threshold value are equal.

29. The access terminal of claim 27 wherein the second load threshold value is greater than the first load threshold value.

30. The access terminal of claim 6 wherein the load level module is further configured to average the filtered indications to determine the aggregate load level.

31. The method of claim 14 wherein combining the filtered indications comprises averaging the filtered indications to determine the aggregate load level.

32. The access terminal of claim 22 wherein the load means is configured to average the indications for each of the plurality of BTSs over the period of time to determine the filtered indication for each of the plurality of BTSs.

33. The access terminal of claim 32 wherein the load means is further configured to average the filtered indications to obtain the aggregate traffic load.

\* \* \* \* \*